Oct. 6, 1942.  E. H. LAND  2,298,058
LIGHT-POLARIZING DEVICE
Filed June 20, 1941
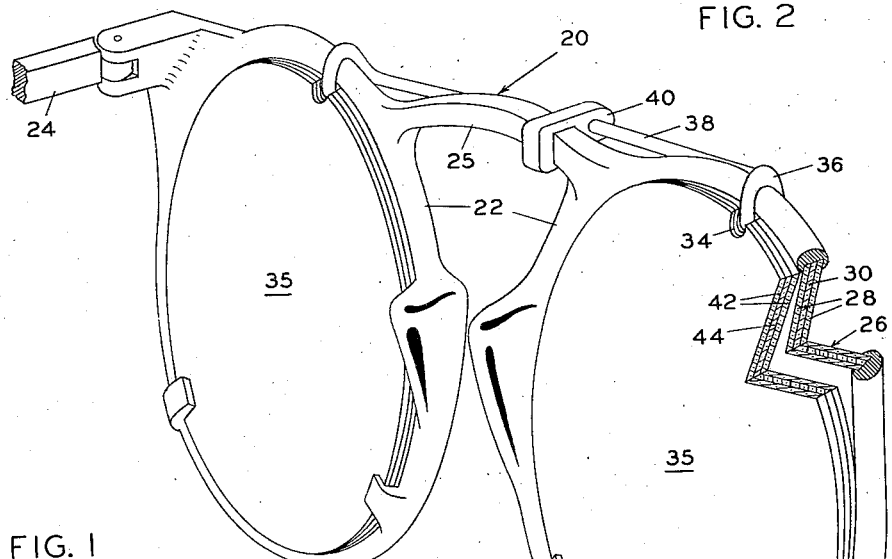
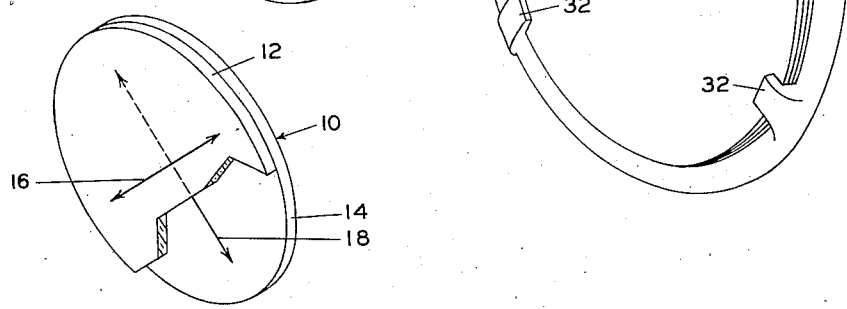
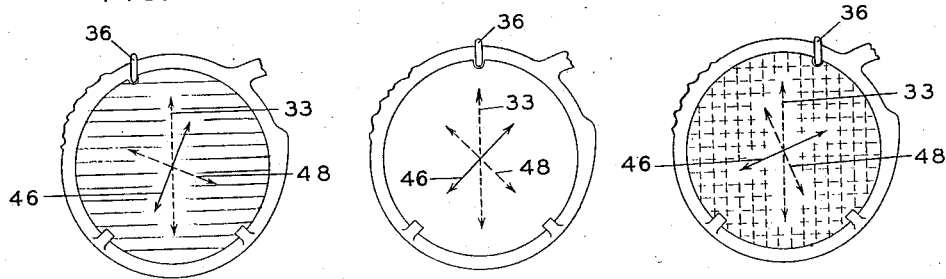
Edwin H. Land
INVENTOR.
BY Donald L. Brown Patented Oct. 6, 1942

2,298,058

UNITED STATES PATENT OFFICE 2,298,058

LIGHT-POLARIZING DEVICE

Edwin H. Land, Cambridge, Mass., assignor to Polaroid Corporation, Dover, Del., a corporation of Delaware Application June 20, 1941, Serial No. 398,913

17 Claims. (Cl. 88—65)

This invention relates to light-polarizing devices, and particularly to devices for polarizing predetermined components of light of predetermined colors, and to eyeglasses utilizing such novel light polarizers.

It is one object of the present invention to provide a novel light-polarizing device capable of absorbing one component of light of a predetermined wavelength band or color and the component vibrating at right angles thereto of light of an entirely different wavelength band or color.

Another object is to provide such a novel light-polarizing device in the form of a sheet of a transparent, plastic material having the molecules on its opposite sides oriented in directions substantially at right angles to each other and having dichroic dyes of different colors incorporated in each said oriented surface.

A further object is to provide a variable density viewing device having a plurality of extinction positions and capable of transmitting light of a different color in each of said extinction positions.

A still further object is to provide a variable density viewing device comprising a fixed polarizing element and a rotatable polarizing element capable in one relative position of said elements of transmitting light of one color, in another position of transmitting light of a different color, and in still another position of transmitting light of substantially no predominant color.

A still further object is to provide variable density eyeglasses wherein it is possible to vary not only the intensity of the light transmitted but also its color.

Other objects and advantages will in part appear and in part be pointed out in the course of the following description of several embodiments of the invention, which are given as non-limiting examples, in connection with the accompanying drawing, in which:

Figure 1 is a perspective view, partly broken away, showing an embodiment of the novel light-polarizing device of the invention;

Fig. 2 is a perspective view, partly broken away, showing a pair of variable density, variable color eyeglasses constructed in accordance with the invention and combining a light polarizer such as that shown in Fig. 1; and Figs. 3, 4 and 5 are detailed views in elevation illustrating diagrammatically the operation of the eyeglasses shown in Fig. 2.

Fig. 1 represents a polarizing element 10 in laminated form comprising a pair of sheet-like layers 12 and 14. In accordance with the invention, each of said layers represents a polarizer for a predetermined wavelength band less than the whole visible spectrum, the band polarized by one layer being different from that polarized by the other. The transmission axis of layer 12 is represented as being parallel to arrow 16 and the transmission axis of layer 14 is represented as being parallel to arrow 18, and it will be noted that the two layers are assembled in such manner that their respective transmission axes are relatively perpendicular.

To explain the above construction more fully, it may be assumed, for example, that layer 12 is of such polarizing properties that it absorbs light of a predetermined wavelength band or color vibrating at right angles to arrow 16 but transmits freely all light of other wavelengths or colors as well as light of the absorbed wave-length band vibrating parallel to arrow 16. For example, layer 12 may comprise a layer of oriented plastic material stained with a yellow dichroic dye and, in this case, it will transmit all light vibrating parallel to arrow 16 but will transmit only predominantly yellow light vibrating at right angles to said arrow.

In the above example, layer 14 may be of analogous polarizing properties but is preferably adapted to polarize a different wavelength band of light from that polarized by layer 12. For example, layer 14 may have incorporated therewith a blue dichroic dye and, in this case, it will transmit all light vibrating parallel to arrow 18 but only predominantly blue light vibrating at right angles to said arrow. When the above illustrative layers are combined, as shown in Fig. 1, the resulting polarizer 10 will be of such polarizing properties that it will transmit substantially only the yellow light vibrating in one direction and substantially only the blue light of the component vibrating perpendicularly thereto.

It will therefore be seen that if such a polarizer is combined with a neutral polarizer having its transmission axis vertical, the light transmitted will be predominantly blue and, if the neutral polarizer is rotated through 90 degrees, the light transmitted will be predominantly yellow. Similarly, if a beam of polarized white light is incident on element 10 with its vibration direction parallel to arrow 16, the yellow light therein will be absorbed by blue layer 14 and the beam transmitted by element 10 will be predominantly blue. Conversely, if a beam of polarized light is incident on element 10 with its vibration direction parallel to arrow 18, the blue component of light therein will be absorbed by yellow layer 12 and the light transmitted will be predominantly yellow.

In the above examples, layers 12 and 14 may be formed of a variety of materials such as films or sheets of a suitably dyed or stained plastic. A suitable sheet material for use therein is a transparent plastic particularly from the class consisting of the hydrophilic, linear high polymers and preferably such plastics as have molecules containing strongly polar groups, that is to say, groups which render the molecules polar or dipolar. Highly satisfactory results have been obtained with plastics of this class containing molecules having hydroxyl groups such, for example, as polyvinyl alcohol, polyvinyl acetal and regenerated cellulose, and of these the preferred material is polyvinyl alcohol.

Layers 12 and 14 in the above example may advantageously comprise sheets of polyvinyl alcohol which have incorporated therein a dichroic dye or dyes of the desired color. Such dyes are preferably chosen with a view to their ability to show high dichroism over a relatively narrow wavelength band, and the dye used in one sheet will preferably be of such color that it shows relatively little or no absorption for light of the wavelength band absorbed by the dye used in the other said color. The term "dichroism" is used herein as meaning the property of differential absorption of the components of an incident beam of light, depending upon the vibration directions of said components. By "dichroic" dye or stain is meant a dye or stain whose molecules possess the property of showing dichroism. In the practice of the present invention, this property is displayed when said dyes are incorporated in molecularly oriented plastic materials, in that the resulting stained areas show dichroism.

If it be desired to form element 10 as described above with blue and yellow layers, layer 12 may be made conveniently by casting a sheet of polyvinyl alcohol from a solution to which has been added a dichroic yellow dye, such for example as Solantine Yellow FF or Stilbene Yellow 3GA. Similarly, layer 14 may be cast from a solution of polyvinyl alcohol to which has been added a suitable dichroic blue dye such as Niagara Sky Blue 6B. Sheets prepared in this manner appear to show the best dichroism when the molecules therein are substantially oriented, as for example by stretching the sheet to from six to seven times its cast length. Satisfactory results have been obtained with sheets which have been subjected to a considerably less stretch, however. The stretched sheets may then be assembled in superimposed relation with their respective directions of molecular orientation perpendicular to each other, and they may be laminated together by any suitable adhesive such as a solution of polyvinyl alcohol.

The dye may be added to sheets 12 and 14 in a variety of ways other than by adding it to the solution from which the sheets are cast. For example, a cast sheet may be imbibed in a solution of the desired dye and the orientation operation may take place either before or after the dyeing step. Alternatively, the dye may be applied to the oriented surface of a sheet of the desired plastic by saturating a suitable matrix with the solution and pressing it into contact with the oriented surface of the sheet. Various other ways of producing the desired result will doubtless also be apparent to those skilled in the art.

With respect to the orientation of the dyed sheet, it should be pointed out that it is essential only that the portions thereof penetrated by the dyes require molecular orientation. It is of no importance whether or not the molecules in unstained portions of the sheet be oriented. It is to be understood, therefore, that whenever the products of the invention are specified herein and in the following claims as being substantially oriented, this term is to be interpreted as meaning that at least the dyed portions thereof are oriented.

It will be clear that many other colors and color combinations than that described above may be used for the purposes of the present invention. For example, there may advantageously be used a combination including a dichroic red, brown or green dye. Examples of suitable dyes for this use include Solantine Red 8BL, Erie Fast Brown 3RB, and for the green, a mixture of the blue and either of the yellow dyes mentioned above. Some of the uses of these various combinations will be pointed out hereinafter, and it is to be understood that all such combinations are to be construed as within the scope of the invention.

Although polyvinyl alcohol has been described as the preferred material for use herein, it is to be understood that any similar material from which there may be made a polarizer for a predetermined wavelength band will satisfy the requirements of the invention and is to be construed as being within the scope. For example, dyed and oriented polyvinyl acetal or regenerated cellulose are admirably suited for use herein.

Furthermore, element 10 need not be in laminated form. With the materials mentioned, and particularly with polyvinyl alcohol, it is possible to orient the molecules on each surface of the sheet in directions at right angles to each other and then to dye one oriented surface with a dye of one color and another oriented surface with a dye of the other desired color. The resulting product will be found substantially identical in operation and polarizing properties with laminated polarizer 10, and it is to be understood that any and all such modifications are also to be construed as within the scope of the invention and of the claims herein.

Figs. 2 to 5 show one application of the novel light polarizer of the present invention, namely in a variable color viewing device such as eyeglasses. Fig. 2 shows a conventional ophthalmic frame 20 of the spectacle type comprising a pair of lens-mounting rims 22 connected by a bridge 25 and with conventional temples indicated at 24.

Fixedly mounted in each of rims 22 is a lens 26 comprising light-polarizing material. Lenses 26 may conveniently be in laminated form, as shown, comprising protective disks 28 of glass or other suitable, transparent plastic, having bonded therebetween a layer 30 of light-polarizing material. Polarizing layer 30 should preferably be chosen for its ability to polarize uniformly substantially all visible light, and suitable materials for this purpose include the sheet polarizing films sold under the trade name "Polaroid."

Lenses 26 are preferably fixed in rims 22 with the transmission axis of polarizing layer 30 substantially perpendicular to the horizontal, as is indicated by arrow 33 in Figs. 3–5, and in this position said lenses will act to absorb horizontally vibrating light such as that polarized by reflection from glare-producing surfaces.

Each of rims 22 is provided with means such as a plurality of lugs 32 for detachably and rotatably mounting a supplemental lens 35. There are also provided means for rotating lenses 35 in unison, and means comprising notches 34 in said lenses, adapted to receive the looped ends 36 of a strap element 38 carried by supporting element or button 40 slidably mounted on bridge 25. Preferably, strap element 38 is of resilient material and under slight tension so that ends are forced downwards on rims 22 and into engagement with notches 34. It will thus be seen that when button 40 is moved along bridge 25, lenses 35 will be caused to rotate in unison within supporting lugs 32.

As shown in Fig. 2, each of supplemental lenses 35 may be in laminated form, comprising a pair of protective disks 42 of glass or other transparent plastic having a central layer 44 bonded therebetween. In a preferred embodiment of the invention, layer 44 comprises a polarizing element of similar polarizing properties to those of element 10 shown and described above in connection with Fig. 1.

Figs. 3–5 show somewhat diagrammatically the operation of the eyeglasses shown in Fig. 2, and for purposes of illustration it is assumed that polarizer 44 comprises a yellow polarizing layer whose transmission axis is indicated by arrow 46 and a blue polarizing layer whose transmission axis is indicated by arrow 48.

In Fig. 3, lens 35 is shown as having been rotated within the frame to a position wherein transmission axis 46 of the yellow layer is approaching parallelism with transmission axis 33 of polarizing element 30 in the fixed lens. In this position, transmission axis 48 of the blue layer is substantially crossed with the transmission axis of the fixed polarizer. The yellow layer will therefore transmit substantially all of the light incident on lens 35 from polarizer 30, but the blue layer will transmit only the predominantly blue component, as is indicated by the shading in Fig. 3.

In Fig. 4, lens 35 is represented as having been rotated within the frame until the respective transmission axes of the blue and yellow layers are at angles of substantially 45 degrees with transmission axis 33 of polarizer 30. In this position a relatively large portion of both components of the incident light will be transmitted by both layers. Accordingly, it will be seen that this is the neutral position and that the light transmitted by the combined lenses will have substantially no predominant color.

In Fig. 5, lens 35 is represented as having been rotated to a position wherein transmission axis 48 of the blue layer is approaching parallelism with transmission axis 33 of polarizer 30. In this position transmission axis 46 of the yellow layer is substantially crossed with the transmission axis of the neutral polarizer. Accordingly, the blue layer will have no appreciable effect, but the yellow layer will transmit predominantly yellow light and this will be the predominant color of the light transmitted by the combined lenses, as is indicated by the shading of lens 35.

For convenience of illustration, the degree of rotation of lens 35 shown in Figs. 3–5 is not a full 90 degrees. It is to be understood, however, that such degree of rotation is contemplated by the invention but is not in fact necessary, the device shown in Fig. 1 being operative to a very satisfactory extent with a degree of rotation substantially less than 90 degrees, for example 70 degrees.

With the colors and dyes used as described above, it will be found that the minimum transmission of the glasses is in the blue position shown in Fig. 3 and the maximum transmission is in the yellow position shown in Fig. 5, owing primarily to the fact that the yellow dyes have a substantially shorter absorption curve than the blue. It will be obvious, however, that color combinations other than blue and yellow may be similarly used. Alternatively, one of the colored layers may be eliminated and any single color used in the remaining layer. For example, layer 44 may comprise an oriented sheet of polyvinyl alcohol having incorporated therewith a dichroic green dye such, for example, as a combination of Niagara Sky Blue 6B and Solantine Yellow FF. With this modification incorporated into the eyeglasses shown in Fig. 2 and with the transmission axis thereof lying parallel to arrow 48, the combined lenses will transmit predominantly green light in the position shown in Fig. 3 and polarized light of no predominant color in the position shown in Fig. 5.

In still another modification, layer 44 may comprise a neutral polarizer similar in polarizing properties to layer 30, crossed with a partial or color polarizer such as one of the yellow, blue or other layers described above. For example, referring to Figs. 3–5, layer 44 may be in laminated form and may comprise a green polarizer having its transmission axis parallel to arrow 46, laminated to a neutral polarizer having its transmission axis parallel with arrow 48. Such a neutral polarizer may be formed, for example, by staining an oriented sheet of polyvinyl alcohol with a solution containing tri-iodide ions.

With this modification incorporated into the eyeglasses shown in Fig. 2, the combined lenses will transmit virtually no light in the position shown in Fig. 3, by reason of the fact that the two neutral polarizers will be substantially crossed. In the position shown in Fig. 4, the light transmitted will be predominantly green but of relatively low intensity, and in the position shown in Fig. 5, the transmitted light will be predominantly green and of relatively high intensity. It is to be understood that all such combinations should be construed as within the scope of the invention.

Since certain changes may be made in the above devices, and different embodiments of the invention could be made without departing from the scope thereof, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A light-polarizing device in sheet form comprising, in combination, means providing a dichroic, light-polarizing layer adapted to show maximum dichroism in a predetermined wavelength band less than the entire visible spectrum, and means providing a second dichroic, light-polarizing layer overlying said first named layer and adapted to show maximum dichroism in light of a different, predetermined wavelength band from said first named layer, the respective transmission axes of said light-polarizing layers being substantially at right angles to each other.

2. A light-polarizing device in sheet form comprising, in combination, means providing a dichroic, light-polarizing layer adapted to show maximum dichroism in a predetermined wavelength band less than the entire visible spectrum, and means providing a second dichroic, light-polarizing layer overlying said first named layer and having different light-polarizing properties from said first mentioned means, the transmission axes of said polarizing layers being substantially at right angles to each other.

3. A light-polarizing device comprising a sheet of a hydrophilic, linear, high polymeric plastic having at least its surface molecules substantially oriented, the direction of molecular orientation of one of said surfaces being substantially at right angles to that of the other said surface, each of said surfaces having a different dichroic dye incorporated therein, each of said dyes absorbing light of a predetermine wavelength band to a greater extent than light absorbed by the other said dye.

4. A laminated, light-polarizing device comprising a plurality of sheets of a molecularly oriented, hydrophilic, linear, high polymeric plastic the molecules of which contain hydroxyl groups, each of said sheets having a different dichroic dye incorporated therewith, each of said dyes absorbing light of a predetermined wavelength band to a greater extent than light absorbed by the other said dye, said sheets being bonded together with their respective directions of molecular orientation substantially at right angles to each other.

5. A light-polarizing device comprising a sheet of polyvinyl alcohol having at least its surface molecules substantially oriented, the direction of molecular orientation of one of said surfaces being substantially at right angles to that of the other said surface, each of said surfaces having a different dichroic dye incorporated therein, each of said dyes absorbing light of a predetermined wavelength band to a greater extent than light absorbed by the other said dye.

6. A laminated, light-polarizing device comprising a plurality of sheets of polyvinyl alcohol, each of said sheets having a different dichroic dye incorporated therewith, each of said dyes absorbing light of a predetermined wavelength band to a greater extent than light absorbed by the other said dye, said sheets being bonded together with their respective directions of molecular orientation substantially at right angles to each other.

7. A light-polarizing device comprising a sheet of polyvinyl alcohol having at least its surface molecules substantially oriented, the direction of molecular orientation of one of said surfaces being substantially at right angles to that of the other said surface, each of said surfaces having incorporated therein a dichroic dye different from the dye incorporated in the other said surface, one of said dyes absorbing one component of light of a predetermined wavelength band less than the visible spectrum, the other of said dyes absorbing one component of light substantially uniformly throughout the visible range of the spectrum.

8. A light-polarizing device comprising a sheet of polyvinyl alcohol having at least its surface molecules substantially oriented, the direction of molecular orientation of one of said surfaces being substantially at right angles to that of the other said surface, one of said surfaces having a yellow dichroic dye incorporated therein and the other of said surfaces having a blue dichroic dye incorporated therein.

9. Variable light-filtering means comprising, in combination, a light-polarizing element adapted to absorb one component of light of a predetermined wavelength band less than the visible spectrum and the component vibrating at right angles thereto of light of a different predetermined wavelength band less than the visible spectrum, a second light-polarizing element adapted to polarize uniformly substantially all visible light, means providing a common mounting for said polarizing elements, said elements being mounted in substantially parallel relation and at least one thereof being mounted for rotation relatively to the other, and means for producing relative rotation between said polarizing elements.

10. Variable light-filtering means comprising, in combination, a light-polarizing element comprising a plurality of overlying, dichoic light-polarizing layers, said element being adapted to absorb one component of light of a predetermined wavelength band less than the visible spectrum and the component vibrating at right angles to said first named component of light of a different predetermined wavelength band less than the visible spectrum, a second light-polarizing element adapted to polarize uniformly substantially all visible light, means providing a common mounting for said polarizing elements, said elements being mounted in substantially parallel relation and at least one thereof being mounted for rotation relatively to the other, and means for producing relative rotation between said polarizing elements.

11. Variable light-filtering means comprising, in combination, a light-polarizing element adapted to polarize light of a predetermined wavelength band less than the visible spectrum and to transmit light of other wavelengths in substantially unpolarized condition, a second light-polarizing element adapted to polarize uniformly substantially all visible light, means providing a common mounting for said polarizing elements, said elements being mounted in substantially parallel relation with their respective transmission axes relatively perpendicular, a third polarizing element adapted to polarize uniformly substantially all visible light, said third polarizing element being positioned within said mounting means in parallel relation with and overlying said first named polarizing elements, and means for producing relative rotation between said third polarizing element and said first named polarizing elements.

12. Variable light-filtering means comprising, in combination, means providing a dichroic, light-polarizing element adapted to absorb light of a predetermined wavelength band to a greater extent than light of other wavelengths, means providing a second dichroic, light-polarizing element overlying and parallel with said first named element and adapted to absorb light substantially uniformly throughout the visible spectrum, the respective transmission axes of said light-polarizing elements being substantially perpendicular to each other, means providing a third light-polarizing element adapted to polarize uniformly substantially all visible light, means providing a common mounting for said polarizing elements, said third polarizing element being positioned within said mounting means in parallel relation with and overlying said first named polarizing elements, and means for producing relative rotation between said third polarizing element and said first named polarizing elements.

13. Variable light-filtering means comprising, in combination, a light-polarizing element adapted to polarize uniformly substantially all visible light, a second light-polarizing element adapted to absorb one component of light substantially uniformly throughout the visible spectrum and the component vibrating at right angles thereto of light of a predetermined wavelength band less than the visible spectrum, means for rotatably mounting one of said elements substantially overlying and parallel with the other said element, and means for rotating said rotatably mounted element with respect to the other said element.

14. Variable light-filtering means comprising, in combination, a light-polarizing element adapted to polarize uniformly substantially all visible light, a second light-polarizing element adapted to transmit one component of light of a predetermined wavelength band less than the visible spectrum and to absorb other light, means for rotatably mounting one of said elements substantially overlying and parallel with the other said element, and means for rotating said rotatably mounted element with respect to the other said element.

15. Eyeglasses comprising, in combination, frame means comprising a bridge element and a pair of lens-holding rims, a lens fixedly mounted in each of said rims and comprising substantially neutral light-polarizing material, means on each of said rims for rotatably and detachably mounting a supplemental lens, a pair of supplemental lenses mounted therein, one adjacent each of said fixedly mounted lenses, each of said supplemental lenses being adapted to polarize light of a predetermined wavelength band relatively narrower than the band polarized by said first named lenses, and means for rotating said supplemental lenses in unison to vary the color of the light transmitted by said glasses.

16. Eyeglasses comprising, in combination, frame means comprising a bridge element and a pair of lens-holding rims, a lens fixedly mounted in each of said rims and comprising substantially neutral light-polarizing material, means on each of said rims for rotatably and detachably mounting a supplemental lens, a pair of supplemental lenses mounted therein, one adjacent each of said fixedly mounted lenses, each of said supplemental lenses being adapted to absorb one component of light of a predetermined wavelength band and the component vibrating at right angles thereto of light of a different predetermined wavelength band, each of said predetermined wavelength bands being respectively narrower than the band polarized by said first named lenses, and means for rotating said supplemental lenses in unison to vary the color of the light transmitted by said glasses.

17. Eyeglasses comprising, in combination, frame means comprising a bridge element and a pair of lens-holding rims, a lens fixedly mounted in each of said rims and comprising substantially neutral light-polarizing material, means on each of said rims for rotatably and detachably mounting a supplemental lens, a pair of supplemental lenses mounted therein, one adjacent each of said fixedly mounted lenses, each of said supplemental lenses containing a sheet of molecularly oriented polyvinyl alcohol having a different dichroic dye incorporated in each of its surfaces, each of said dyes absorbing one component of light of a predetermined wavelength band to a greater extent than light absorbed by the other said dye, the direction of molecular orientation in the portion of the sheet containing one said dye being substantially perpendicular to the direction of molecular orientation in the portion of the sheet containing the other said dye, and means for rotating said supplemental lenses in unison to vary the color of the light transmitted by said glasses.

EDWIN H. LAND.